(12) United States Patent
Jermolajev

(10) Patent No.: US 8,211,595 B2
(45) Date of Patent: Jul. 3, 2012

(54) METAL IDENTIFICATION PLATELET AND METHOD OF PRODUCING THEREOF

(75) Inventor: Igor Jermolajev, Prague (CZ)

(73) Assignee: Optaglio, Ltd., Swindon (GB)

( * ) Notice: Subject to any disclaimer, the term of this patent is extended or adjusted under 35 U.S.C. 154(b) by 960 days.

(21) Appl. No.: 10/597,661

(22) PCT Filed: Dec. 2, 2004

(86) PCT No.: PCT/CZ2004/000082
§ 371 (c)(1),
(2), (4) Date: May 25, 2007

(87) PCT Pub. No.: WO2005/078530
PCT Pub. Date: Aug. 25, 2005

(65) Prior Publication Data
US 2008/0145765 A1    Jun. 19, 2008

(51) Int. Cl.
*G03H 1/02* (2006.01)
*B60R 25/00* (2006.01)

(52) U.S. Cl. .............. 430/1; 430/2; 359/3; 205/120; 205/122; 205/135

(58) Field of Classification Search .............. None
See application file for complete search history.

(56) References Cited

U.S. PATENT DOCUMENTS

| | | | | |
|---|---|---|---|---|
| 1,963,834 A * | 6/1934 | Decker | | 205/72 |
| 2,255,440 A * | 9/1941 | Sherman | | 205/75 |
| 2,322,135 A * | 6/1943 | Howell | | 40/207 |
| 3,565,978 A * | 2/1971 | Folger et al. | | 264/1.34 |
| 3,728,231 A * | 4/1973 | Gurev | | 205/118 |
| 4,092,234 A * | 5/1978 | Horst et al. | | 204/297.05 |
| 4,108,660 A * | 8/1978 | Gale et al. | | 430/321 |
| 4,360,586 A * | 11/1982 | Flanders et al. | | 430/321 |
| 4,368,979 A * | 1/1983 | Ruell | | 356/71 |
| 4,552,832 A * | 11/1985 | Blume et al. | | 430/320 |
| 4,677,285 A * | 6/1987 | Taniguchi | | 235/488 |
| 4,921,319 A * | 5/1990 | Mallik | | 359/1 |
| 5,429,392 A * | 7/1995 | Loving | | 283/72 |
| 6,036,232 A * | 3/2000 | Kaule et al. | | 283/85 |
| 6,643,001 B1 * | 11/2003 | Faris | | 356/37 |
| 6,666,995 B1 | 12/2003 | Meikka | | |
| 7,288,320 B2 * | 10/2007 | Steenblik et al. | | 428/403 |
| 2003/0178734 A1 | 9/2003 | Josephy | | |
| 2004/0003638 A1 * | 1/2004 | Schaefer et al. | | 72/41 |
| 2004/0031404 A1 * | 2/2004 | Dixon | | 101/3.1 |
| 2006/0014017 A1 * | 1/2006 | Pilotek et al. | | 428/402 |
| 2010/0110514 A1 * | 5/2010 | Houha et al. | | 359/2 |

FOREIGN PATENT DOCUMENTS

| | | | |
|---|---|---|---|
| EP | 421181 | * | 4/1991 |
| EP | 0 629 989 | | 12/1994 |
| JP | 03-058077 | * | 3/1991 |
| JP | 05-016152 | * | 1/1993 |
| JP | 08-058274 | * | 3/1996 |
| WO | 89/01016 | * | 2/1989 |

* cited by examiner

*Primary Examiner* — Martin Angebranndt
(74) *Attorney, Agent, or Firm* — Kilpatrick Townsend & Stockton LLP

(57) ABSTRACT

A metal identification platelet equipped with an identification code, while the identification code comprises a hologram. A method of producing the identification platelet with the identification code, including the following steps: A shield from an electro-insulation material is formed on a shim with a holographic motif. Then, the shim is galvanized in the places not covered by the shield from the electro-insulation material. And the completed metal identification platelets are removed from the shim.

16 Claims, 4 Drawing Sheets

METAL IDENTIFICATION PLATELET AND METHOD OF PRODUCING THEREOF

This application is a 371 of PCT/CZ2004/000082, entitled "METAL IDENTIFICATION PLATELET AND METHOD OF PRODUCING THEREOF," filed Dec. 2, 2004, which claims priority to PV2004-234, filed Feb. 12, 2004. Each of the foregoing applications is incorporated herein by reference for all purposes.

TECHNICAL FIELD

The invention relates to a metal identification platelet equipped with an identification code, and to the production of the metal identification platelet.

BACKGROUND ART

There are many systems for marking products, which are aimed at clear identification of products at all times and thus at discouraging an eventual thief, since a marked product cannot be sold easily. The success of such identification systems, however, depends on the fact, how easily the applied identification elements can be removed or modified.

For instance, each produced automobile bears a unique code, the so-called VIN (Vehicle Identification Number), which enables to identify the origin of a vehicle. However, presentation of the VIN code on a production label of a car is only a little obstacle for a thief, because there exist many possible ways how to modify the VIN code on a production label.

As a result, an Australian company, the Datadot Technology Limited, use so-called data dots—polyester platelets in the shape of little discs having cca 1 mm in diameter and being cca 0.1 mm thick, which bear an identification code burned on by laser. As for cars, this code can be the same as the abovementioned VIN code, consisting of 17 characters.

These platelets are to be mixed with a special adhesive material, which, upon hardening, is transparent and fluoresces under ultraviolet light. The mixture of the adhesive and the platelets can be applied on selected parts of a car by means of e.g. a spray gun, so the marking of the individual parts of the car does not last long. The adhesive is resistant to high or low temperatures and commonly accessible chemicals. The code presented on the platelets can be read by means of a simple and cheap microscope. A great amount of identification platelets (cca 5000 identification platelets applied during tests) are applied on various parts of one car, so an eventual thief will not be able to remove all of them.

A device for applying such identification platelets has been known from e.g. Australian patent AU 2001100633, or U.S. Pat. No. 715,864, or European patent application EP 1216758.

From British patent GB 2346583 a microdot for identification of products is known. The microdot comprises 14 lines of an alphanumeric code and 16 lines of a code, which is a mirrored image of the abovementioned alphanumeric code. This solution enables to read the code from both sides of the microdot.

The purpose of the invention is to design such identification platelets/dots that cannot be copied easily, and, at the same time, to suggest the production of such identification platelets/dots, which would enable to create a hologram on the smallest possible platelet.

DISCLOSURE OF INVENTION

The abovementioned goal is achieved by a metal identification platelet equipped with an identification code, in accordance with the invention, the essence of which is that the identification code comprises a hologram.

The metal identification platelet with the hologram allows more identification data to be applied on one platelet in comparison with a well-known identification platelet, which bears an identification code burned on by laser.

According to a preferred embodiment, in addition to the hologram the identification code on the platelet can be constituted by an arbitrarily formed passage shape hole, which is visible from both sides of the identification platelet, although in a mirrored image only. Moreover, the identification code can be constituted by an external shape of the platelet, thus representing another distinguishing element when a marked product is to be identified.

According to another preferred embodiment, the hologram and/or shape hole comprises of alphanumeric characters.

The identification platelet can be made from nickel being 1 to 15 μm thick.

The abovementioned goal will be achieved also by means of a method of producing of a metal identification platelet with an identification code, according to the invention, the essence of which is that it comprises the following steps: A shield from an electro-insulation material is formed on a shim with a holographic motif. Then, the shim is galvanized in the places not covered by the shield from the electro-insulation material. The completed metal identification platelets are removed from the shim.

Using the method according to the invention, a hologram can be created with advantage also on a metal platelet of minimum size; however, the method according to the invention can be applied during the production of any identification elements, such as tags or labels of any shape and size, provided with a hologram and applied on a product in order to facilitate its identification.

The shield from the electro-insulation material can be formed by means of direct shim printmaking using non-conductive varnish, or a paint in a common printing manner, or by developing a photoresist layer.

According to one of the embodiments, the electro-insulation material shield is produced as follows: a photoresist layer Is applied on the shim with a holographic motif, then a mask is put on the photoresist layer and the photoresist layer with the mask is exposed by a UV lamp and the exposed photoresist layer is etched from the shim in a developer.

Than the shim is galvanized in the places where the photoresist layer was etched, The waste photoresist layer is removed.

Finally the completed metal identification platelets are taken from the shim.

In order to facilitate the removal of the completed identification platelets from the shim, the shim surface can be passivated with the solution of potassium dichromate.

According to a preferred embodiment, the shim can galvanized in a galvanic-plastic nickel bath.

The waste electro-insulation shield and/or waste photoresist layer can be removed with advantage by being washed in a solvent, and then the shim can be washed in demineralised water and dried.

The final metal identification platelets can be removed from the shim with advantage by fine scraping or in an ultrasonic bath.

According to a preferred embodiment, the shim with a holographic motif can be made from nickel.

According to another preferred embodiment, the electro-insulation shield can be applied directly on a shim with a holographic motif using a printing method, with advantage by intaglio printing.

BRIEF DESCRIPTION OF DRAWINGS

The invention will be explained by means of drawings.

MODES FOR CARRYING OUT THE INVENTION

Figure 1:
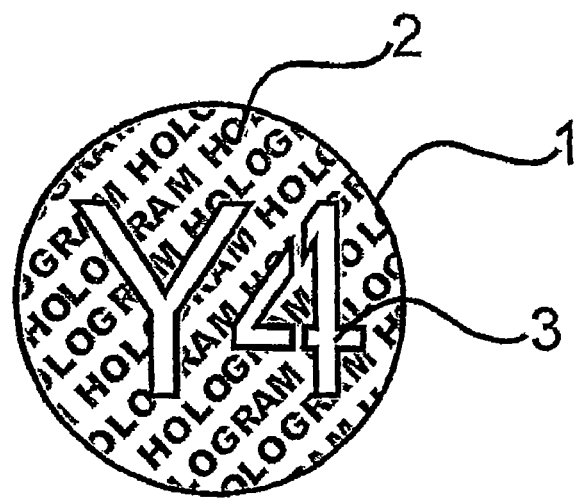
FIG. 1 represents schematically the first embodiment of the metal identification platelet according to the invention, round-shaped, the identification code of which Is constituted by a hologram combined with passage holes in the form of a letter and numeral.

FIG. 1 shows the first example of a particular embodiment of metal identification platelet 1. Identification platelet 1 is made from nickel, 5 µm thick; it is enlarged in FIG. 1, because the actual diameter of this embodiment is 0.5 mm. Identification platelet 1 is equipped with an identification code, which, in this embodiment, comprises a hologram 2 as well as a passage shape holes 3. The hologram 2 and the passage shape holes 3 are shown in a simplified way only. Experts understand that the holograms 2 and the passage shape holes 3 may include arbitrary images and groups of alphanumeric characters.

Figure 2:
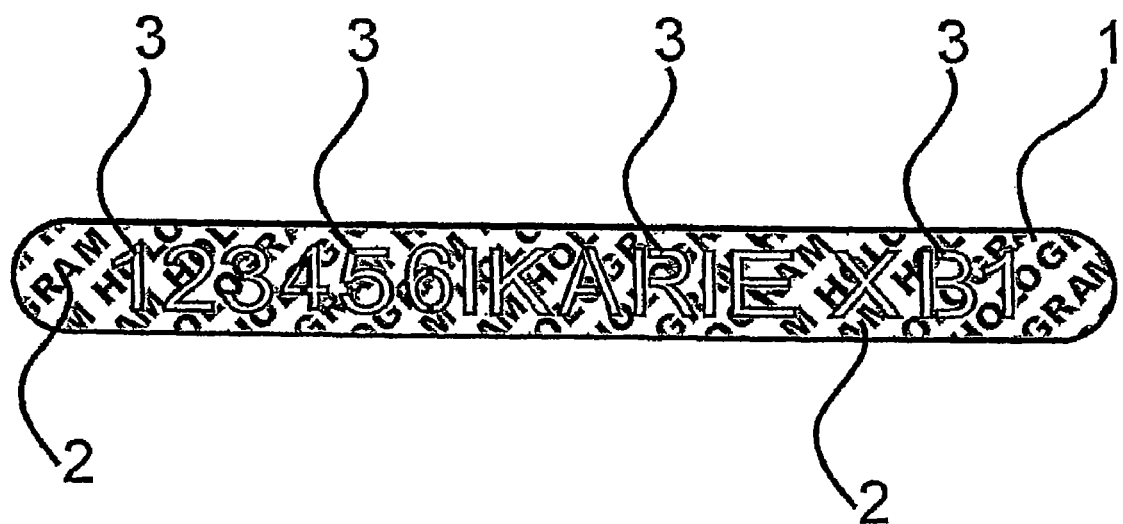
FIG. 2 shows the second embodiment of the metal identification platelet according to the Invention, oblong-shaped.

FIG. 2 shows the second embodiment of metal identification platelet 1 (enlarged), made from nickel, 10 µm thick, 3 mm long and 0.3 mm wide. The identification platelet 1 is provided with an identification code, which again includes hologram 2 and passage shape holes 3 shown as alphanumeric characters for simplicity purposes.

Metal identification platelets 1 are produced on shim 4 with holographic motif 7, corresponding to required hologram 2, which is to be carried by the identification platelets 1.

In the embodiments described below, a shim 4 was used, made from nickel by a well-known method used in the production of pressed holograms, and described, for instance, in a book by Graham Saxby, Practical Holography—Second Edition, Prentice Hall International, the disclosure of which is incorporated by reference. Therefore, the well-know method of the production of the shim for pressed holograms will not be described further.

Shield 9 from the electro-insulation material is made by development of a photoresist layer 5 or by direct printmaking of the shim 4 using a non-conductive varnish or paint applying a common printing method.

In, the first embodiment, the method of producing metal identification platelet 1 will be described, where the shield 9 from the electro-insulation material was produced by using the photoresist layer 5.

While forming the shield 9 from the electro-insulation material by developing the photoresist layer 5, a method known as photolithography, which is commonly used in the production of printed circuits and integrated circuits, can be applied. Such methods are described for example in a book by Mark A. McCord, M. J. Rooks, SPIE HANDBOOK OF MICROLITOGRAPHY, MICROMACHINING AND MICROFABRICATION, the disclosure of which is incorporated by reference. Therefore, detailed information on the production of shield 9 from the electro-insulation material by the development of the photoresist layer 5 will not be described further.

In order to make removing the completed identification platelets 1 easier, the shim 4 with the holographic motif 7 was passivated by the solution of potassium dichromate with the concentration of 3 g/l.

Then, the photoresist layer 5 having thickness of 3 µm, was applied on shim 4 with the holographic motif 7. Thickness ranging from 1 to 5 µm is recommended. A positive photoresist was used. However, experts understand that a negative photoresist can be used as well. The photoresist 5 was applied in a centrifuge. After that a burning in a furnace at the temperature ranging from 60 to 65° C. followed.

Then a mask 6, constituted by a printing film produced on a well-known imagesetter, was put on the photoresist layer 5. The ask 6 is made from a transparent material, on which non-transparent areas 8 have been created (see FIG. 4).

Figure 3:
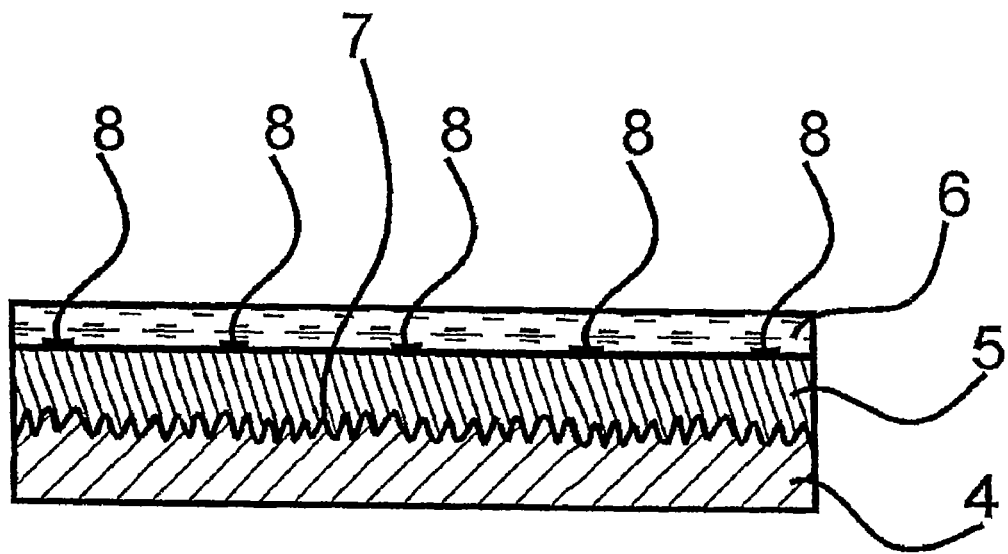
FIGS. 3 to 7 show a shim schematically drawn in various steps of the first example of the metal identification platelet production method according to the invention.

The shim 4 with applied photoresist layer 5 and the mask 6 are shown in FIG. 3 in cross section.

Figure 4:
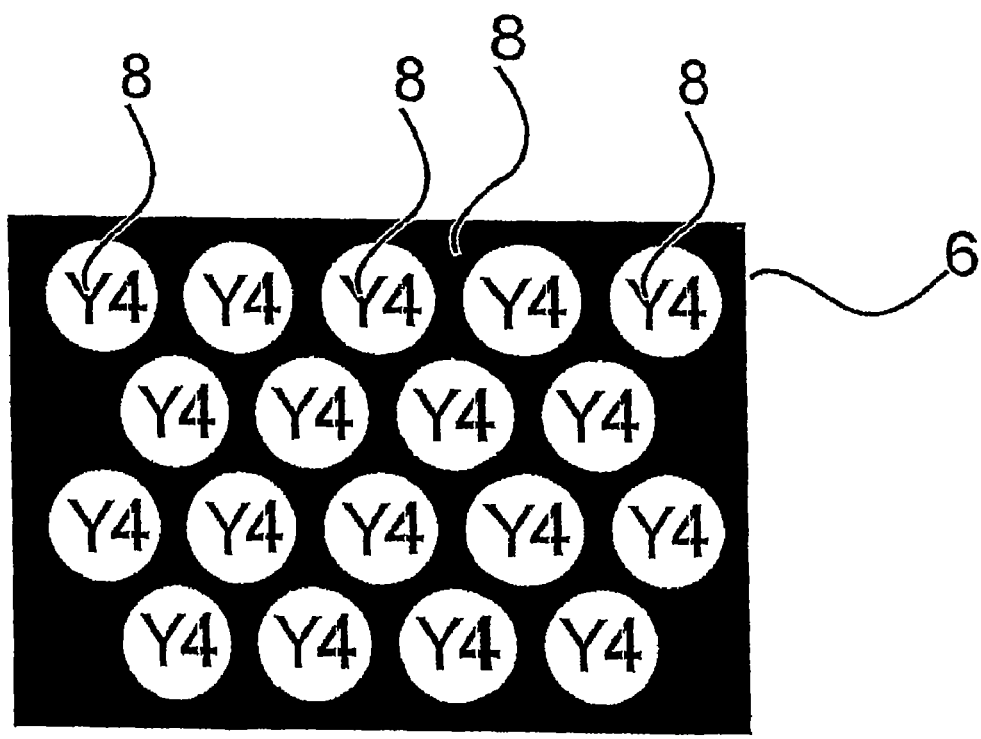

FIG. 4 shows that non-transparent areas 8 of the mask 6 cover the shim 4 in the places that separate future individual identification platelets, as well as in the places, where passage shape holes are to be created in the future identification platelets, for instance, in the form of the shown alphanumeric characters. As for more complicated shape passages, the final shape can be "dotted".

By shaping the mask 6 and/or the final shield 9 any shape of the identification platelets 1 as well as the passage shape holes 3 can be produced. The shape of the platelets 1 is thus another distinguishing element, when a marked product is to be identified.

After that the photoresist layer 5 with the applied mask 6 was exposed by a UV lamp and then the exposed photoresist layer 5 was etched from the shim 4 in a developer. Microposir 351 Developer produced by Shipley Europe Limited was used. However, experts understand that any standard developer can be used.

Figure 5:
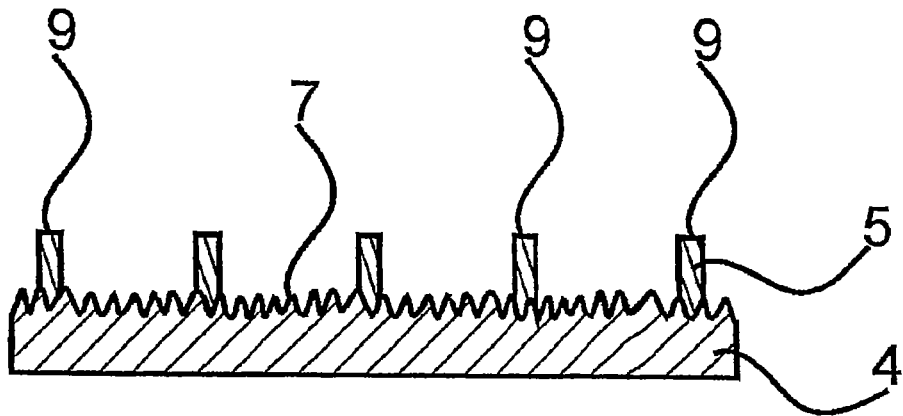

FIG. 5 shows the shim 4 in section, where photoresist layer 5 is etched from the shim 4 in the places outside the non-transparent areas 8 of the mask 6. Remaining photoresist layer 5 thus constitutes shield 9 made of electro-insulation material. In the places of the future identification platelets 1, the holographic motif 7 of the future hologram 2 can be seen.

Figure 6:
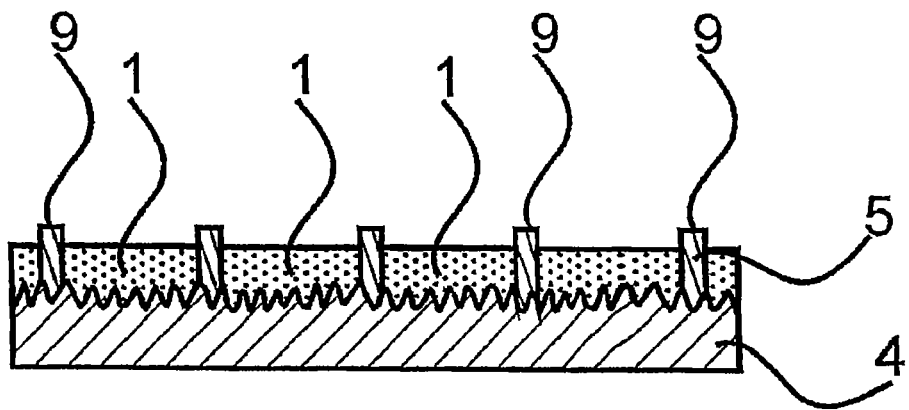

Then the shim 4 was dipped into the galvanic-plastic nickel bath and covered by a layer of nickel having thickness of 4 µm. The layer of nickel was built in the places where the photoresist layer 5 was removed. The nickel layer formed the identification platelets 1. The surface of the shim 4 covered by the shield 9 from the electro-insulation material is insulated and therefore not plated. The shim 4 in this stage of production is shown in FIG. 6.

Figure 7:
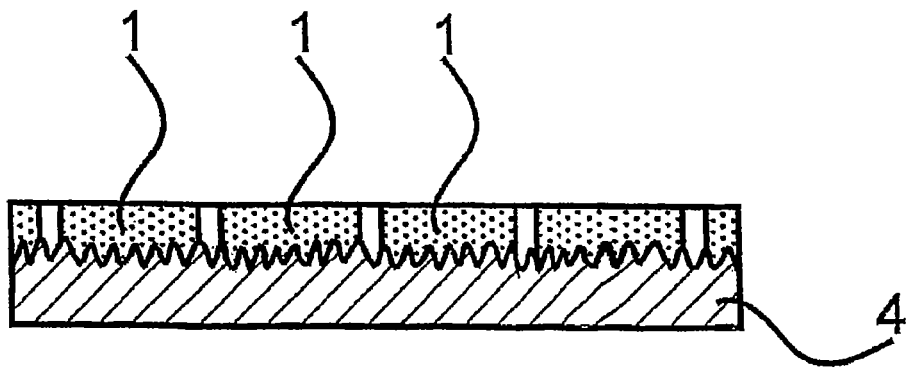

Waste photoresist layer 5 was removed from the shim 4 by lye. Then the shim 4 was washed with demineralised water and dried. The shim 4 in this stage of production is shown in FIG. 7.

Completed metal identification platelets 1 were removed from the shim 4 in an ultrasonic bath.

The second embodiment will describe the production of metal identification platelet 1, where shield 9 from the electro-insulation material was formed by printmaking using a non-conductive paint.

In order to make removing the completed identification platelets 1 easier, the shim 4 with the holographic motif 7 was passivated by the solution of potassium dichromate with the concentration of 3 g/l.

Then the shield 9 from the electro-insulation material was printed on the shim 4 with holographic motif 7. The shield 9 from the electro-insulation material was produced by printing the shim 4 with the non-conductive paint applying the method of intaglio printing.

Figure 8:
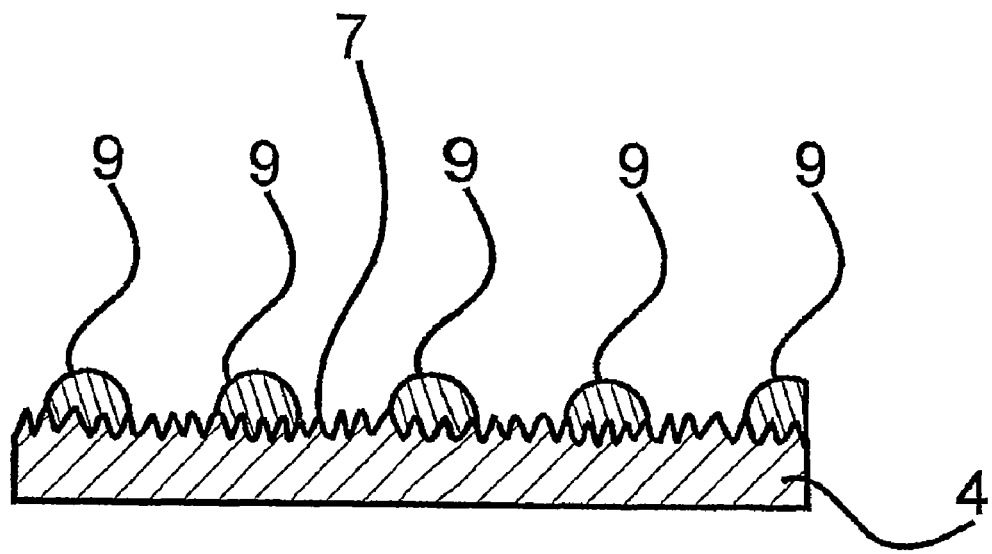
FIGS. 8 to 10 show again a shim schematically drawn in various steps of the second example of the metal identification platelets production method according to the invention.

The shim 4 in this stage of production, i.e. with applied shield 9 from the electro-insulation material, is shown in FIG. 8 in a simplified section.

Figure 9:
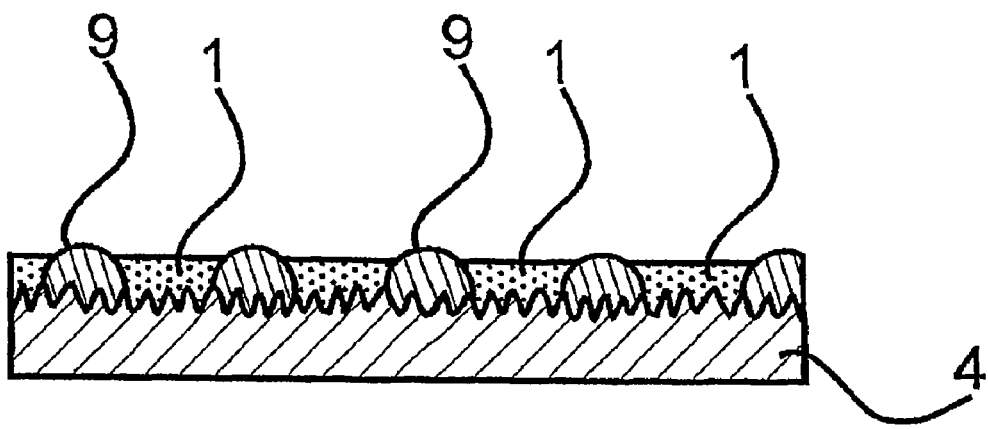

The shim 4 prepared in this way was dipped into the galvanic-plastic nickel bath and covered with 5 μm thick nickel layer in the places not covered by shield 9 from the electro-insulation material. The nickel layers then created the identification platelets 1. The surface of the shim 4 covered with the shield 9 from the electro-insulation material is insulated, therefore not plated. The shim 4 in this stage of production is shown in FIG. 9.

The example describes galvanisation with nickel; however, experts understand that other metals that can be applied in a galvanic manner may be used as well.

Figure 10:
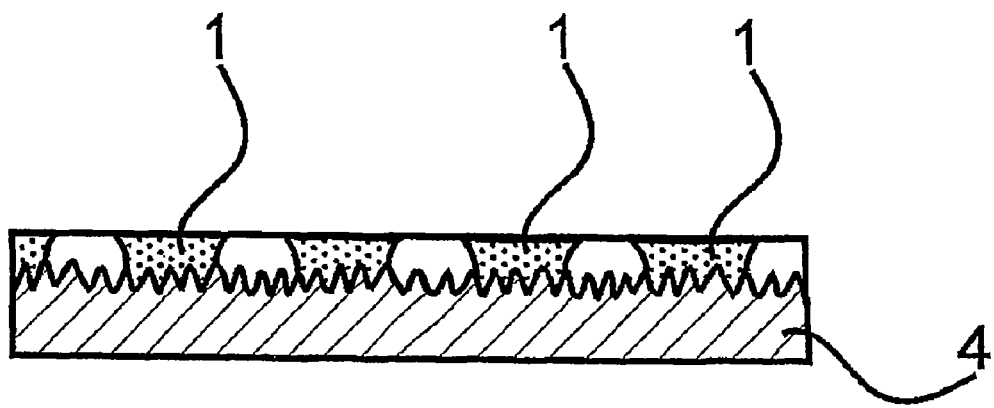

In the next step, the shim 4 was dipped into a solvent, which removed the electro-insulation material of the shield 9, and then the shim 4 was washed with demineralised water and dried. The shim 4 in this stage of production is shown in FIG. 10.

Finally, the completed metal identification platelets 1 were removed from the shim 4 by fine scraping. Alternately, an ultrasonic bath can be used to remove the identification platelets 1 from the shim 4.

The completed identification platelets 1 bear hologram 2, which is an imprint of the holographic motif 7, initially created on the shim 4. This method of production enables to create the hologram 2 also on identification platelets of minimum size, which would not be possible using the well-known method of producing pressed holograms.

The size of the identification platelet 1 and the passage shape holes 3 in this identification platelet 1 is limited only by the graphic resolution of photolithographic or printing devices used for the production of the shield 9 from electro-insulation material.

This resolution amounts to 10000 dpi in optical photolithography and 200000 dpi in electron photolithography. The resolution in well-known printing devices is lower; for instance, in intaglio printing, it does not exceed 500 dpi.

The invention claimed is:

1. A metal identification platelet having an outer periphery and equipped with an identification code, wherein the identification code comprises a hologram on the platelet surface, and wherein the identification code further comprises a passage shape hole that is located within the outer periphery and that passes completely through the platelet where the platelet has been separated from a shim.

2. The metal identification platelet as in claim 1, wherein the hologram and/or shape hole comprises an alphanumeric character.

3. The metal identification platelet as in claim 1, wherein the metal is nickel, with a thickness of 1 to 15 μm.

4. The metal identification platelet as in claim 1, wherein the identification code is further defined by an external shape of the platelet.

5. The metal identification platelet as in claim 1, wherein the passage shape hole is surrounded on all sides by the hologram.

6. A method of producing an identification platelet with an identification code, the method comprising:
    forming a shield from an electro-insulation material on a shim with a holographic motif, wherein the shield defines a certain shape,
    then, galvanizing the shim in places not covered by the shield from the electro-insulation material, and
    removing the completed metal identification platelets from the shim, wherein the resulting platelet includes the holographic motif on it's surface and a through hole defined by at least a portion of the certain shape of the shield.

7. The method as in claim 6, wherein forming the shield from the electro-insulation material comprises:
    applying a photoresist layer on the shim with a holographic motif,
    then putting a mask on the photoresist layer,
    exposing the photoresist layer with the mask by a UV lamp,
    etching the exposed photoresist layer from the shim in a developer,
    then galvanizing the shim in the places where the photoresist layer was etched,
    removing the waste photoresist layer, and
    taking completed metal identification platelets from the shim.

8. The method as in claim 7, wherein the mask comprises a printing film.

9. The method as in claim 6, further comprising passivating the shim by a solution of potassium dichromate.

10. The method as in claim 6, wherein the shim is galvanized in a galvanic-plastic nickel bath.

11. The method as in claim 6 further comprising:
    removing the shield from the electro-insulation material and/or waste photoresist layer by washing in a solvent, and
    then washing the shim in demineralized water and drying the shim.

12. The method as in claim 6, further comprising removing the completed metal identification platelet from the shim by fine scraping or in an ultrasonic bath.

13. The method as in claim 6, wherein the shim with the holographic motif is made from nickel.

14. The method as in claim 6, further comprising applying the shield from the electro-insulation material directly on the shim with the holographic motif using a printing method.

15. The method as in claim 14, further comprising applying the shield from the electro-insulation material using the method of intaglio printing.

16. The method as in claim 6, wherein the resulting platelet further includes an external shape defined by at least a portion of the certain shape of the shield.

* * * * *